United States Patent
Goldstein et al.

(10) Patent No.: US 9,825,311 B2
(45) Date of Patent: Nov. 21, 2017

(54) WATER ACTIVATED BATTERY

(71) Applicant: Epsilor-Electric Fuel LTD, Beit Shemesh (IL)

(72) Inventors: Jonathan R. Goldstein, Jerusalem (IL); Shahaf Kozokaro, Netanya (IL)

(73) Assignee: Epsilor Electric Fuel, LTD., Beit Shemesh (IL)

( * ) Notice: Subject to any disclaimer, the term of this patent is extended or adjusted under 35 U.S.C. 154(b) by 35 days.

(21) Appl. No.: 15/041,401

(22) Filed: Feb. 11, 2016

(65) Prior Publication Data
US 2017/0237082 A1 Aug. 17, 2017

(51) Int. Cl.
*H01M 6/34* (2006.01)
*H01M 6/30* (2006.01)
(Continued)

(52) U.S. Cl.
CPC ............. *H01M 6/34* (2013.01); *H01M 4/043* (2013.01); *H01M 4/0471* (2013.01); *H01M 4/08* (2013.01); *H01M 4/5825* (2013.01); *H01M 4/621* (2013.01); *H01M 4/622* (2013.01); *H01M 4/623* (2013.01); *H01M 4/625* (2013.01); *H01M 2004/021* (2013.01); *H01M 2004/028* (2013.01)

(58) Field of Classification Search
CPC ........ H01M 6/34; H01M 4/621; H01M 4/625; H01M 4/622; H01M 4/623; H01M 4/5825; H01M 4/043; H01M 4/0471; H01M 4/08; H01M 2004/028; H01M 2004/021
See application file for complete search history.

(56) References Cited

U.S. PATENT DOCUMENTS

| | | | | |
|---|---|---|---|---|
| 5,242,768 A | * | 9/1993 | Nagatsuka | D03D 25/005 139/425 R |
| 5,424,147 A | * | 6/1995 | Khasin | H01M 6/34 29/623.5 |

(Continued)

FOREIGN PATENT DOCUMENTS

WO        WO 95/30248        11/1995

OTHER PUBLICATIONS

PCT International Search Report for PCT/IL2017/050026, dated May 23, 2017.
(Continued)

*Primary Examiner* — Stewart Fraser
(74) *Attorney, Agent, or Firm* — Robert G. Lev

(57) ABSTRACT

The invention provides a water-activated, deferred-action battery having a housing containing at least one cell, comprising at least one anode selected from the group consisting of magnesium, aluminum, zinc and alloys thereof; a cathode comprising a skeletal frame including conductive metal and having a portion of its surface area formed as open spaces, and further comprising a heat-pressed, rigid static bed of active cathode material encompassing the skeletal frame, the cathode material comprising basic copper sulfate, said cathode material being compacted and fused to itself and to the skeletal frame under pressure and / or heat, to form a heat-fused, conductive, electrochemically active phase; at least one cavity separating the cathode and the at least one anode, and at least one aperture leading to the at least one cavity for the ingress of an electrolyte-forming, aqueous liquid.

25 Claims, 1 Drawing Sheet

(51) Int. Cl.
*H01M 4/58* (2010.01)
*H01M 4/62* (2006.01)
*H01M 4/04* (2006.01)
*H01M 4/08* (2006.01)
*H01M 4/02* (2006.01)

(56) References Cited

U.S. PATENT DOCUMENTS 6,010,799 A * 1/2000 Jafri .................. H01M 4/06
 429/118
2015/0004457 A1 1/2015 Visco et al.

OTHER PUBLICATIONS

PCT Written Opinion of the International Searching Authority for PCT/IL2017/050026, dated May 23, 2017.

* cited by examiner

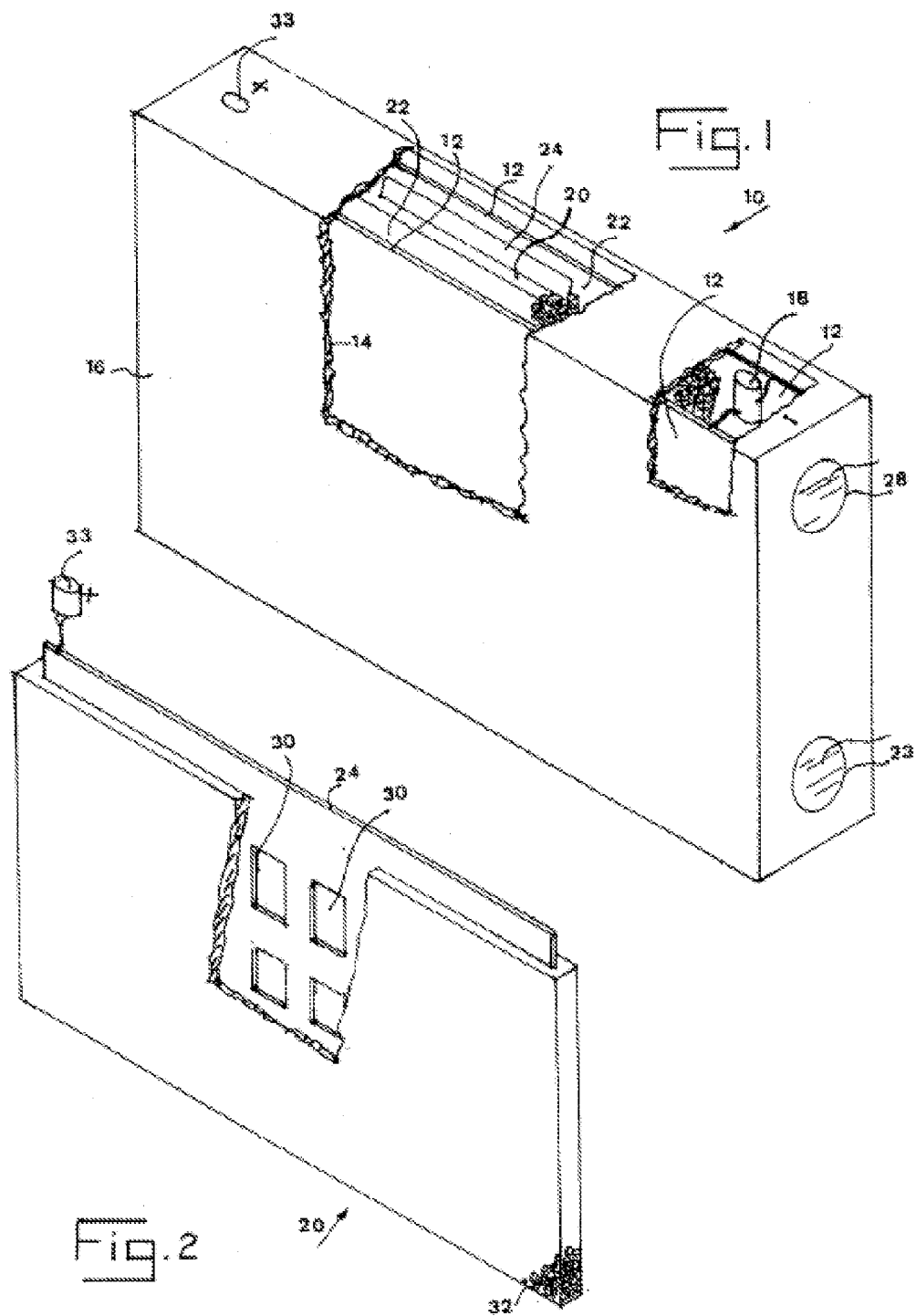

WATER ACTIVATED BATTERY

BACKGROUND

The present invention relates to water-activated, deferred-action batteries and to a method for producing a cathode for such batteries.

More particularly the present invention relates to a deferred-action battery which is adapted to be activated by immersing it in water. Such batteries may be used for automatically powering emergency lamps and sirens on life-jackets and in case of flooding, for example.

Deferred-action batteries have been known for decades, and various embodiments of such batteries and methods for the production and use thereof, as well as for the manufacture of their component parts, have been described, inter alia, in U.S. Pat. Nos. 2,491,640; 2,636,060; 2,655,551; 2,658,935; 2,716,671; 2,817,697; 3,343,988; 3,859,136; 3,953,238; 4,016,339; 4,192,913; 4,261,853; 4,332,864; 4,368,167; 4,487,821; 4,803,135; and 4,822,698.

As described, for example, in U.S. Pat. No. 2,491,640, batteries of this type are intended especially for use in operating an emergency signal at sea. The signal may be a light to indicate the presence of a person who has become stranded by shipwreck or other causes. It may also be an electronic apparatus floating on the water and emitting a signal which can be detected at a distant point. The battery is adapted to energize the signal and to be activated by immersion in water, which may be the fresh water of an inland lake or river, or the salt water of the ocean.

Such batteries essentially comprise an anode which is usually a magnesium alloy, and a cathode that has traditionally been a silver or copper halide, wherein discharge of the stored energy is initiated by immersing the battery in seawater, which serves as a conducting electrolyte between the anode and the cathode.

Most of the older patents that relate to batteries of this type describe the use of cathodes based on cuprous chloride, while more recent patents such as U.S. Pat. No. 4,192,913 and U.S. Pat. No. 4,261,853 describe cathodes based on cuprous thiocyanate.

U.S. Pat. No. 5,424,147 to Khasin et al, describes a water-activated, deferred-action battery having a housing containing at least one cell, comprising at least one anode selected from the group consisting of magnesium, aluminum, zinc and alloys thereof; a cathode comprising a skeletal frame including conductive metal and having a portion of its surface area formed as open spaces, and further comprising a heat-pressed, rigid static bed of active cathode material encompassing the skeletal frame, the cathode material being formed of cuprous chloride, sulfur, carbon and a water-ionizable salt and being compacted and fused under pressure and heat to itself and to the skeletal frame, to form a heat-fused, conductive, electrochemically active phase; at least one cavity separating the cathode and the at least one anode, and at least one aperture leading to the at least one cavity for the ingress of an electrolyte-forming, aqueous liquid.

Other cathodes described in the Literature have as active material, Copper Sulfate, Lead Chloride, Copper Iodide, Lead Oxide or Potassium Persulfate.

All of the above materials suffer from one or more of the following problems: Sensitivity to humidity upon storage resulting in expansion of the cathode on storage until the cavity between the anode and cathode no longer exists, fast dissolution in water upon activation which results in early failure and high cost. Many use toxic materials.

SUMMARY OF THE INVENTION

In accordance with the present invention, it has now been discovered that a basic copper sulfate may usefully be used in the cathode of water-activated, deferred-action batteries.

Basic copper sulfate (sulphate) is also known as tribasic copper sulfate has not previously been used as a cathode for a water activated battery.

Basic copper sulfate is non-toxic and is not sensitive to humidity on storage. It does not dissolve quickly into water and is a relatively low cost material, being cheaper than silver chloride, for example.

A water-activated deferred action battery may comprise a housing containing at least one cell, comprising (a) at least one anode selected from the group consisting of magnesium, aluminum, zinc and alloys thereof; (b) a cathode, comprising a skeletal frame including conductive metal and having a portion of its surface area formed as open spaces, and further comprising a heat-pressed, rigid static bed of active cathode material encompassing said skeletal frame, said cathode material comprising basic copper sulfate as active material, compacted and fused to itself and to the skeletal frame by applying pressure and heat, to form a heat-fused, conductive, electrochemically active phase; (c) at least one cavity separating said cathode and said at least one anode; and (d) at least one aperture leading to said at least one cavity, for the ingress of an electrolyte-forming, aqueous liquid.

The term sulfate as used herein is synonymous with sulphate. The US spelling is used for convenience.

The term salt as used herein means a compound that is both a salt and a base because in addition to the usual positive and negative radicals of normal salts, it also contains OH (hydroxide) or O (oxide) ions. Thus for example, bismuth subnitrate $BiONO_3$ and basic copper carbonate $Cu_2(OH)_2CO_3$ are examples of basic salts.

The term basic copper sulfate includes compounds with general formula $xCuSO_4 \cdot yCu(OH)_2 \cdot yH_2O$ where x, y and z indicate the molar ratios of the components. It includes tribasic copper sulfate $CuSO_4 \cdot 3Cu(OH)_2 \cdot H_2O$, and compositions with higher sulfate content such as $2CuSO_4 \cdot Cu(OH)^2$ and $CuSO_4 \cdot Cu(OH)_2$ and mixtures of these.

Other basic copper sulfate salts include tetra-copper hexahydroxide sulfate $H_6Cu_4O_{10}S$ (also known as copper hydroxide sulfate $Cu_4(OH)_6SO_4$; Basic copper sulfate $Cu_4(OH)_6SO_4$; Copper hydroxide sulfate $2[Cu_2(OH)_3] \, SO_4$; Copper oxysulfate; Copper sulfate $Cu_4(OH)_6SO_4$; Cuproxat; Cuproxat flowable; Microcop; Sulfuric acid, copper salt, tribasic; copper(2+) hydroxide sulfate (3:22); copper(2+) hydroxide sulfate (4:6:1)) obtainable from Chemnet. CAS Registry Number 1333-22-8.

A first aspect of the invention is directed to a water-activated, deferred-action battery having a housing containing at least one cell, comprising:
a) at least one anode selected from the group consisting of magnesium, aluminum, zinc and alloys thereof;
b) a cathode comprising at least one basic copper sulfate on a skeletal frame.
c) at least one cavity separating said cathode and said at least one anode; and d) at least one aperture leading to said at least one cavity for the ingress of an electrolyte-forming, aqueous liquid.

Preferably, the basic copper sulfate is compacted and fused to itself and to the skeletal frame, to form a heat-fused, conductive, electrochemically active material.

Preferably, a portion of a surface of the cathode is formed as open spaces.

Preferably, the cathode further comprises an electronically conductive material which optionally is selected from the group comprising graphite, carbon black and carbon fibers.

Preferably, the cathode further comprises a soluble, ionically conductive material, such as a salt of an alkali, alkali earth element or of a transition metal for example.

Preferably, the ionically conductive material comprises a halide or a sulfate.

Preferably, the cathode further comprises a binder material, such as a fluoropolymer, a kaolin, sulfur or a wax such as paraffin wax, for example.

Preferably the cathode material is fused to itself by heating during or after compression.

In some embodiments, the cathode material further comprises copper sulfate.

A second embodiment is directed to a cathode material for an activated, deferred-action battery comprising at least one basic copper sulfate on a skeletal frame.

Optionally, the cathode material further comprises an electronically conductive material which may be selected from graphite, carbon black and carbon fibers, for example.

Optionally, the cathode material further comprises a soluble ionically conductive material, such as a salt of an alkali, alkali earth element or of a transitional metal element, for example.

Optionally, the ionically conductive material comprises a halide or a sulfate.

Optionally, the cathode material further comprises a binder material, such as a fluoropolymer, a kaolin, sulfur or a wax, for example.

Optionally, the cathode material further comprises copper sulfate.

A further aspect is directed to a method of fabricating the cathode material of claim 13, by fusing it to itself by heating during or after compression.

Optionally, in the water-activated, deferred-action battery the anode and cathode are parallel flat plates.

Alternatively the anode is a hollow cylinder and the cathode is a smaller cylinder nested within the anode without contact between the anode and cathode.

Alternatively again the cathode is a hollow cylinder and the anode is a smaller cylinder nested within the cathode without contact between the anode and cathode.

BRIEF DESCPRIPTION OF THE FIGURES

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in, the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a perspective, fragmented view of a preferred embodiment of the battery according to the invention, and FIG. 2 is a perspective, fragmented view of the cathode.

DESCRIPTION OF PREFERRED EMBODIMENTS

There is seen in FIG. 1 a water-activated, deferred-action battery 10 having a single cell. Two spaced-apart anodes 12 are shown, each having the form of a thin plate. Anodes 12 are made of a metal selected from the group comprising magnesium, aluminum, zinc, and alloys thereof. Particularly preferred is a magnesium alloy.

Each anode 12 is held in parallel, adjacent relationship to a major inner face 14 of a plastic battery housing 16. Both anodes 12 are connected in parallel to a negative terminal 18, accessible from outside housing 16.

A cathode plate 20, thicker than but having about the same area as the anodes 12, is positioned between the anodes 12. A cavity 22 containing air and, optionally, separator layers (not shown) are included between the cathode plate 20 and each anode 12 to electrically insulate the cathode 20 from anode 12 while battery 10 is in its inactivated state. Two apertures 23, 28 are shown, both leading to the cavity 22. The aperture 23 has its inlet at the base of the housing 16, and serves for the ingress of an electrolyte-forming aqueous liquid. The aperture 25 has its outlet near the top of the housing 16 and serves to allow air to escape as liquid enters the battery to start power-producing operation. The aperture 28 also allows the escape of hydrogen subsequently evolved during operation of the battery. In a preferred embodiment, the higher aperture is located on an opposite surface of housing 16.

Since basic copper sulfate is insoluble, usefully, unlike the battery described in U.S. Pat. No. 5,424,147 to Khasin et al, the apertures 23, 28 do not require sealing by a water soluble film to protect the battery before use and to extend its shelf-life.

As seen more clearly in FIG. 2, the cathode plate 20 comprises a skeletal frame 24 including conductive metal and having a portion of its surface area formed as open spaces 30. The main bulk of the cathode plate 20 comprises a heat-pressed, rigid, static bed 32 of active cathode material including basic copper sulfate encompassing the skeletal frame 24.

The active cathode material may further include sulfur, carbon a polymeric binder such as a fluoropolymer, wax and/or a water-ionizable salt. The carbon may suitably be provided as graphite, carbon fibers or carbon black, where carbon black is preferred.

In order to prevent leaching-out of said salt during battery activation such as would occur with the use of sodium chloride, with consequent loss of electrolyte conductivity when the battery is immersed in lake or fresh river water, the water-ionizable salt is selected to be only sparingly soluble in water. Advantageously the water-ionizable salt has a solubility in ambient temperature water of less than 50 gm/liter. A suitable salt is $CaSO_4$, either provided and used alone or together with sodium chloride.

The discharge reaction against a Mg based anode in water could be:

$CuSO_4 + Mg \rightarrow Cu + MgSO_4$ and $Cu(OH)_2 + Mg \rightarrow Cu + Mg(OH)_2$

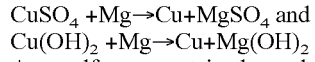

Any sulfur present in the cathode converts any Copper produced by these discharge reactions to CuS, which increases the energy content of the battery.

There is also some parasitic reaction of Mg with the line solution giving hydrogen.

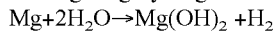

Referring now to FIG. 2, one embodiment of the cathode plate 20 is shown in further detail. The cathode plate 20 is compacted and fused under pressure and heat to itself and to the skeletal frame 24, to form a heat-fused, conductive, electrochemically-active phase. As with many sintering operations, the strength of the form thus produced can be improved by the adding of a suitable binder material; advantageously, fluorinated ethylene propylene and/or kaolin may be added to act as a supplementary binder. The skeletal frame 24 is electrically connected to a positive terminal 33 which is accessible from outside the housing 16.

EXAMPLE 1

A basic copper sulfate cathode was prepared as follows: $CuSO_4.3Cu(OH)_2.H_2O$ 133.6 gm (Northern Michigan Aquatics), sulfur 34.4 gm (Aldrich), carbon black 12 gm (Cabot), sodium chloride 16 gm (Aldrich), and FEP powder 4 gm (DuPont) were weighed into a Pascal blender and blended for two hours. A 20 g sample of the mix was transferred to the cylinder of a piston and cylinder type die, wherein the cylinder had a die recess with an open area of 72.5 mm. First, 10 gm of the mix was poured into the die cylinder and leveled, then the cathode current collector (a pre-tabbed copper expanded metal sheet, approximately 20 mesh, obtained from the Exmet Corp.) was laid over this, and a further 10 g portion of mix added to the die cylinder and leveled.

The standard die was then closed with its mating piston section. The closed die was then heated to 110° C. in a 5 ton press with heated platens (PHI), and the mix pressed for four minutes. After cooling and removing the compact from the die, the cathode was observed to be robust and uniform, with a thickness of 5 mm.

EXAMPLE 2

In order to test the performance of the cathode from Example 1, it was clamped at a uniform spacing of about 1 mm separation between two parallel magnesium anode foils of the alloy type AZ61 (Magnesium Elektron) having a common current takeoff and similar overall area dimensions to the cathode and a thickness of 1 mm. The plate assembly, with one wire proceeding from the common tab of the two magnesium plates out to a signal bulb device, and one wire from the bulb device back to the cathode tab, was immersed into tap water in a 5-liter beaker. The bulb lit immediately, emitting more than one candela of light. After 8 hours, the emitted light intensity remained above one candela, demonstrating that the battery meets aviation and nautical requirements.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A water-activated, deferred-action battery having a housing containing at least one cell, comprising:
   a) at least one anode selected from the group consisting of magnesium, aluminum, zinc and alloys thereof;
   b) a cathode comprising at least one of a group consisting of basic copper sulfate and basic copper carbonate on a skeletal frame;,
   c) at least one cavity separating said cathode and said at least one anode; and,
   d) at least one aperture leading to said at least one cavity for the ingress of an electrolyte-forming, aqueous liquid.

2. The water-activated, deferred-action battery of claim 1, wherein at least one of said basic copper sulfate and said basic copper carbonate is compacted and fused to itself and to the skeletal frame, to form a heat-fused, conductive, electrochemically active material.

3. The water activated deferred action battery of claim 1, wherein a portion of a surface of the cathode is formed as open spaces.

4. The water-activated, deferred-action battery according to claim 1, wherein the cathode further comprising an electronically conductive material.

5. The water-activated, deferred-action battery according to claim 4, wherein said electronically conductive material is selected from the group comprising graphite, carbon black and carbon fibers.

6. The water-activated, deferred-action battery according to claim 1, wherein the cathode further comprises a soluble, ionically conductive material.

7. The water-activated, deferred-action battery according to claim 6, wherein the ionically conductive material comprises a salt of an alkali metal, an alkaline earth metal or a transition metal.

8. The water-activated, deferred-action battery according to claim 7, wherein the ionically conductive material comprises a halide or a sulfate.

9. The water-activated, deferred-action battery according to claim 1, wherein the cathode further comprises a binder material.

10. The water-activated, deferred-action battery according to claim 9, wherein the binder material comprises a fluoropolymer, a kaolin, a wax or sulfur.

11. The water-activated, deferred-action battery according to claim 1, wherein the cathode material is fused to itself by heating during or after compression.

12. The water-activated, deferred-action battery according to claim 1, wherein the cathode material further comprises copper sulfate.

13. A cathode material for an activated, deferred-action battery comprising at least one of a group consisting of basic copper sulfate and basic copper carbonate on a skeletal frame.

14. The cathode material of claim 13, further comprising an electronically conductive material.

15. The cathode material of claim 14, wherein said electronically conductive material is selected from the group comprising graphite, carbon black and carbon fibers.

16. The cathode material of claim 13, further comprising a soluble ionically conductive material.

17. The cathode material of claim 16, wherein the ionically conductive material comprises a salt of an alkali metal, an alkaline earth metal or a salt of a transitional metal element.

18. The cathode material of claim 16, wherein the ionically conductive material comprises a halide or a sulfate.

19. The cathode material of claim 13 further comprising a binder material.

20. The cathode material of claim 19, wherein the binder material comprises a fluoropolymer, a kaolin, wax or sulfur.

21. The cathode material of claim 13 further comprising copper sulfate.

22. A method of fabricating the cathode material of claim 13, by fusing it to itself by heating during or after compression.

23. The water-activated, deferred-action battery according to claim 1 where the anode and cathode are parallel flat plates.

24. The water-activated, deferred-action battery according to claim 1 where the anode is a hollow cylinder and the cathode is a smaller cylinder nested within the anode without contact between the anode and cathode.

25. The water-activated, deferred-action battery according to claim 1 where the cathode is a hollow cylinder and the anode is a smaller cylinder nested within the cathode without contact between the anode and cathode.

\* \* \* \* \*